United States Patent
Ayers et al.

(10) Patent No.: US 9,967,496 B2
(45) Date of Patent: May 8, 2018

(54) ACTIVE RESET CIRCUIT FOR RESET SPREAD REDUCTION IN SINGLE-SLOPE ADC

(71) Applicant: Sony Corporation, Tokyo (JP)

(72) Inventors: Thomas Richard Ayers, Morgan Hill, CA (US); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/198,817

(22) Filed: Jun. 30, 2016

(65) Prior Publication Data

US 2018/0007296 A1 Jan. 4, 2018

(51) Int. Cl.
| | |
|---|---|
| *H04N 5/228* | (2006.01) |
| *H04N 5/376* | (2011.01) |
| *H04N 5/3745* | (2011.01) |
| *H04N 5/378* | (2011.01) |

(52) U.S. Cl.
CPC .............. *H04N 5/376* (2013.01); *H04N 5/378* (2013.01); *H04N 5/37452* (2013.01); *H04N 5/37455* (2013.01)

(58) Field of Classification Search
CPC ...... H04N 5/378; H04N 5/3741; H04N 5/357; H04N 5/3355; H04N 5/3658; H03M 1/56; H03M 1/12; H03K 5/2481; G11C 11/5621

See application file for complete search history.

(56) References Cited

U.S. PATENT DOCUMENTS

| | | | |
|---|---|---|---|
| 6,885,331 B2 * | 4/2005 | Krymski | H03K 4/026 341/155 |
| 9,252,184 B2 * | 2/2016 | Amikawa | H01L 27/14621 |
| 9,525,836 B2 * | 12/2016 | Hashimoto | H03M 1/002 |
| 9,635,299 B2 * | 4/2017 | Hijikata | H04N 5/378 |
| 2003/0146993 A1 | 8/2003 | Kokubun et al. | |
| 2013/0256512 A1 | 10/2013 | Shioya | |
| 2014/0131554 A1 | 5/2014 | Ishii et al. | |

FOREIGN PATENT DOCUMENTS

EP 1-301-028 A1 4/2003

OTHER PUBLICATIONS

International Search Report dated Aug. 31, 2017 for corresponding International Application No. PCT/IB2017/053932.
PCT Written Opinion of the International Searching Authority for PCT/IB2017/053932 dated Aug. 31, 2017.

* cited by examiner

*Primary Examiner* — Trung Diep
(74) *Attorney, Agent, or Firm* — Michael Best & Friedrich LLP (57) ABSTRACT

An image sensor comprises a pixel circuit including a reset transistor and configured to output a pixel signal; and a differential comparator including a pixel input, a reference input, and a comparator output, wherein one of a source or a drain of the reset transistor is connected to the comparator output. In this manner, an active reset method may be incorporated in the image sensor.

20 Claims, 9 Drawing Sheets

ACTIVE RESET CIRCUIT FOR RESET SPREAD REDUCTION IN SINGLE-SLOPE ADC

BACKGROUND OF THE INVENTION

1. Field of the Invention

This application relates generally to image sensors. More specifically, this application relates to reduction of reset spread in image sensors.

2. Description of Related Art

Image sensing devices typically consist of an image sensor, generally an array of pixel circuits, as well as signal processing circuitry and any associated control or timing circuitry. Within the image sensor itself, charge is collected in a photoelectric conversion device of the pixel circuit as a result of the impingement of light. Modern image sensors typically include tens of millions of pixels ("megapixels" or "MP").

The accumulated charge is then converted to a digital value. Such a conversion typically requires several circuit components such as sample-and-hold (S/H) circuits, analog-to-digital converters (ADCs), and timing and control circuits, with each circuit component serving a purpose in the conversion. For example, the purpose of the S/H circuit may be to sample the analog signals from different time phases of the photoelectric conversion device operation, after which the analog signals may be converted to digital form by the ADC. To effectively convert the analog signal to digital form in an array having a large number of pixel circuits, a collection of ADCs work in parallel, with a single ADC being shared by many pixels. The particular sharing arrangement depends on the architecture of the image sensor. For example, the arrangement may be a column-based arrangement whereby all pixel circuits in a column of the array share a single ADC, a shared-column arrangement whereby several columns of pixel circuits share a single ADC, a block-based arrangement whereby a rectangular block of pixel circuits share a single ADC, and the like.

To reduce noise in an image sensor, a correlated double sampling (CDS) method is often used. In CDS, each pixel circuit in the image sensor is sampled twice. In the first measurement, the pixel circuits are reset and the reset voltages from the pixel circuits are measured. This is referred to as the reset or "P-phase" signal. After the first measurement, the pixel circuits are exposed to light such that the photoelectric conversion devices collect charge in accordance with the level of incident light. These charges are measured in a second measurement, which gives an analog signal equal to the light-exposed value plus the reset value. This is referred to as the data or "D-phase" signal. The difference between the two measurements corresponds to the light-exposed signal for the pixel circuit.

However, for the CDS method to work effectively, it is helpful to minimize variations in the reset signal. In a practical CMOS image sensor circuit the total variation of the reset values of all of the pixels in the image sensor must be accommodated by both gain amplifier and ADC functions, especially when operating the sensor under a high analog gain.

For example, in a case where the ADC has an input voltage range of 1 V and the variation of the reset voltage signal is 100 mV, the voltage range allocated for the photodiode signal is 900 mV as the ADC must reproduce the data signal which includes both reset and photodiode variations. As the gain of the amplifier is increased, both reset voltage and data voltage values are amplified such that a gain of 8× (or 18 dB) results in a voltage variation of the reset signal at the ADC input of 800 mV, thus leaving only 200 mV for the photodiode signal variation. In this example, however, a gain level such as 16× (24 dB) is not possible as there would be no allowance for the reset plus photodiode signal variation within the allowed ADC input voltage range.

This allowable photodiode signal range is called the "dynamic range" and is an important parameter in image sensor design. To achieve higher dynamic range at any gain level and to increase the maximum usable dynamic range for the image sensor, there exists a need to reduce the reset signal variation in ADC circuits.

BRIEF SUMMARY OF THE INVENTION

Various aspects of the present disclosure relate to an image sensor that can implement an active reset method with a single-slope ADC.

In one aspect of the present disclosure, an image sensor comprises a pixel circuit including a reset transistor and configured to output a pixel signal; and a differential comparator including a pixel input, a reference input, and a comparator output, wherein one of a source or a drain of the reset transistor is connected to the comparator output.

In another aspect of the present disclosure, an image processing method comprises outputting a pixel signal from a pixel circuit including a reset transistor; and outputting a difference signal from a differential comparator including a pixel input, a reference input, and a comparator output, wherein one of a source or a drain of the reset transistor is connected to the comparator output.

In the above aspects of the present disclosure, a digital-to-analog converter configured to output a reference signal having a ramp waveform is also provided. The digital-to-analog converter may be configured to initialize to an initial signal level and then output the ramp waveform, at which point the differential comparator is configured to perform a P-phase measurement corresponding to a reset level of the pixel circuit, and the digital-to-analog converter may be configured to subsequently re-initialize to the initial signal level and then output the ramp waveform, at which point the differential comparator is configured to perform a D-phase measurement corresponding to a data level of the pixel circuit.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the ADC circuits are used in image sensors, it will be understood that this is merely one example of an implementation. It will further be understood that the disclosed S/H circuits can be used in any device in which there is a need to convert a signal from analog to digital and/or compare two voltages; for example, an audio signal processing circuit, industrial measurement and control circuit, and so on.

In this manner, the present disclosure provides for improvements in the technical field of signal processing, as well as in the related technical fields of image sensing and image processing.

[Image Sensor]

Figure 1:
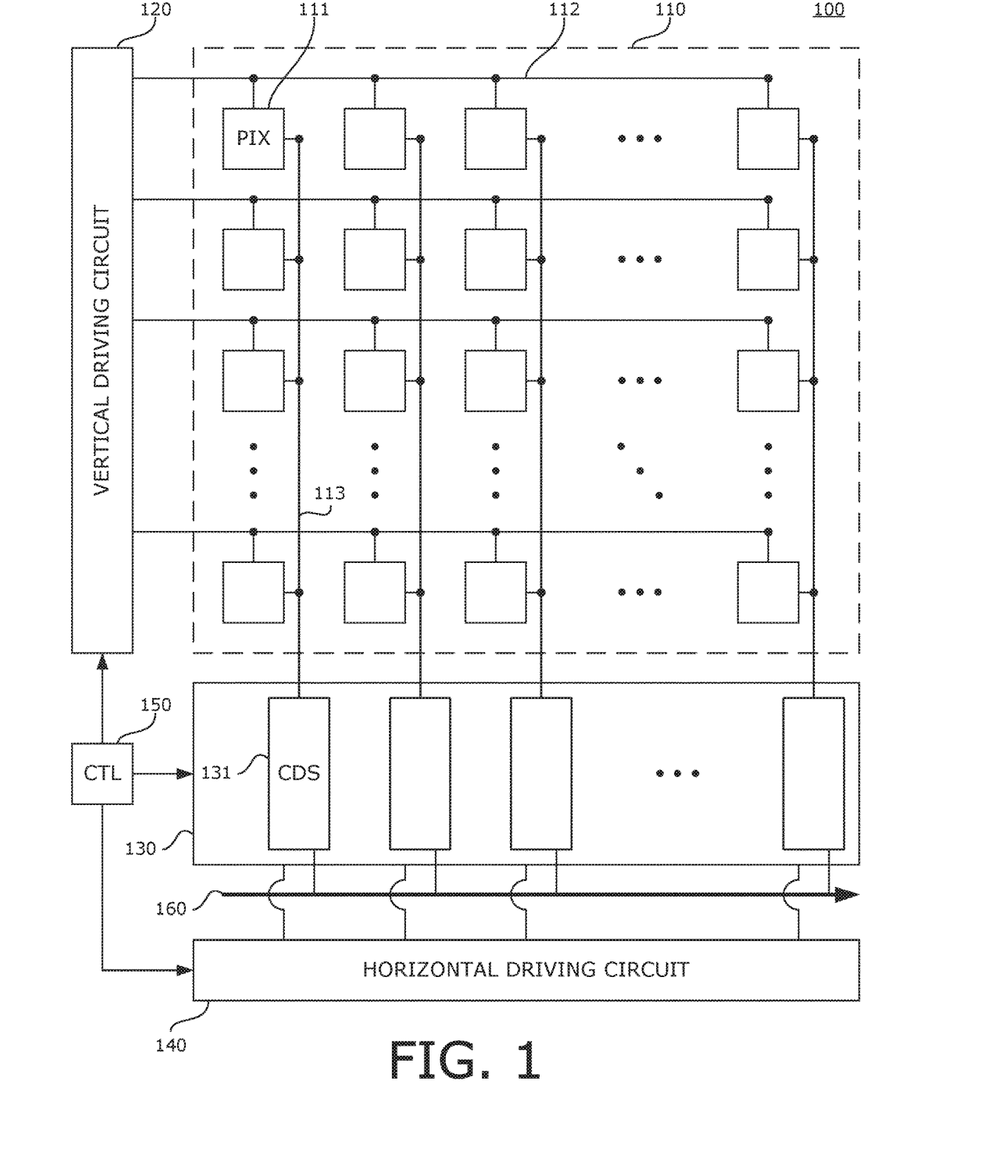
FIG. 1 illustrates an exemplary image sensor according to various aspects of the present disclosure.

FIG. 1 illustrates an exemplary image sensor 100 that implements mode switching in a column sharing architecture, where each column of pixel circuits shares a CDS circuit. Image sensor 100 includes an array 110 of pixel circuits 111. The pixel circuits 111 will be described in more detail below. The pixel circuits 111 are located at intersections where horizontal signal lines 112 and vertical signal lines 113 cross one another. The horizontal signal lines 112 are operatively connected to a vertical driving circuit 120, also known as a "row scanning circuit," at a point outside of the pixel array, and carry signals from the vertical driving circuit 120 to a particular row of the pixel circuits 111. The pixel circuits 111 in a particular column output an analog signal corresponding to an amount of incident light to the vertical signal line 113. For illustration purposes, only a small number of the pixel circuits 111 are actually shown in FIG. 1; however, in practice the image sensor 100 may have up to tens of millions of pixel circuits ("megapixels" or MP) or more.

The vertical signal line 113 conducts the analog signal for a particular column to a column circuit 130. While FIG. 1 illustrates one vertical signal line 113 for each column in the pixel array 110, the present disclosure is not so limited. For example, more than one vertical signal line 113 may be provided for each column, or each vertical signal line 113 may correspond to more than on column. In any case, the column circuit 130 preferably includes a plurality of CDS circuits 131. Individual CDS circuits 131 will be described in more detail below. Other possible circuit components of the column circuit 130, such as S/H circuits, voltage-to-current (V2I) circuits, counters, and the like, are omitted from the illustration of FIG. 1 for clarity purposes.

The column circuit 130 is controlled by a horizontal driving circuit 140, also known as a "column scanning circuit." Each of the vertical driving circuit 120, the column circuit 130, and the horizontal driving circuit 140 receive one or more clock signals from a controller 150. The controller 150 controls the timing and operation of various image sensor components such that analog signals from the pixel array 110, having been converted to digital signals in the column circuit 130, are output via an output circuit 160 for signal processing, storage, transmission, and the like.

During the readout process, the pixel circuits 111 in each row are read together, and the pixel circuits 111 in different rows are read in a row-by-row sequential basis. At the beginning of the processing period, a row of the pixel circuits 111 are connected to the CDS circuits 131 via the vertical signal lines 113. The CDS circuits 131 sample and convert a row of the pixel circuits 111 into digital form. After a row of the pixel circuits 111 has been processed, the image sensor 100 turns to the next row of the pixel circuits 111 and the process is repeated. This is continued until the entire frame is read out.

Figure 2A:
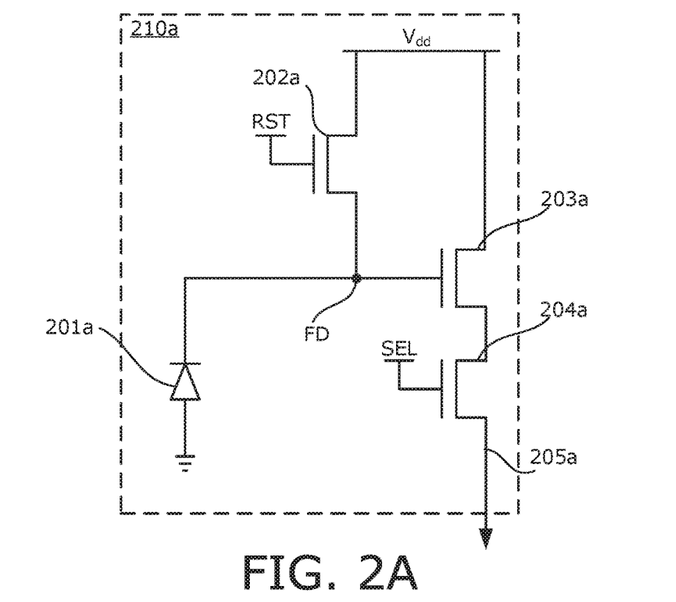
FIG. 2A illustrates an exemplary pixel circuit according to various aspects of the present disclosure.
Figure 2B:
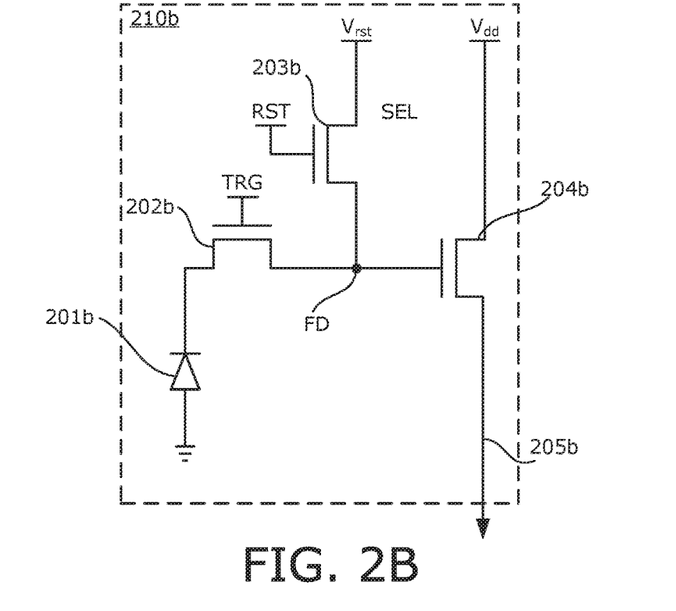
FIG. 2B illustrates another exemplary pixel circuit according to various aspects of the present disclosure.

Two examples of pixel circuit 111 are pixel circuits 210a and 210b as illustrated in FIGS. 2A-B, which are pixel circuits of the so-called 3T-type. As shown in FIG. 2A, pixel circuit 210a includes a photoelectric conversion device 201a (for example, a photodiode), a floating diffusion FD, a reset transistor 202a, a source follower transistor 203a (sometimes called an "amplifier transistor"), a selection transistor 204a, and a vertical signal line 205a. Gate electrodes of reset transistor 202a and selection transistor 204a receive signals RST and SEL, respectively. These signals may, for example, be provided by the control or timing circuitry, such as vertical driving circuit 120 described above. Pixel circuit 210a is operated by first applying a value of the signal RST that causes the photodiode 201a to be cleared of charge and reset continuously. When the signal RST is returned to ground, however, several effects may cause the value at a gate terminal of the source follower transistor 203a to have a value different from the reset voltage $V_{rst}$. Major sources of reset voltage level variations as measured by the vertical signal line 205a include variations from within the pixel 210a and from outside of the pixel 210a.

Variations from within the pixel 210a include kTC noise, which is caused by random variations in the channel resistance of the reset transistor 202a combined with the capacitance at the gate terminal of the source follower transistor 203a; reset charge injection, which is caused by the high-low transition of the signal RST coupling through a parasitic capacitance $C_{gs}$ between the gate and source terminals of the reset transistor 202a; process variation of the transistors, including the threshold voltage $V_t$ of the source follower transistor 203a and the drain-source voltage $V_{ds}$ of the reset transistor 202a; and additional parasitic capacitive coupling effects, such as that between the RST signal line and the photodiode 201a or metal wiring associated with a sense node connected to source follower transistor 204. Variations from outside the pixel 210a include power and signal distribution effects, such as IR drop associated with the pixel voltage and control signals across large arrays of pixels; and offsets and random noise occurring in the readout circuit which processes the output of vertical signal line 205a.

FIG. 2B illustrates another configuration of the 3T-type as pixel circuit 210b. In this circuit, the respective power supply voltages to the source follower transistor 204b and the reset transistor 203b are different. The select transistor 204a of FIG. 2A is not used, whereas a transfer transistor 202b is disposed between the photodiode 201b and the floating diffusion FD. In operation, the photodiode 201b is reset by applying a high voltage at both the reset transistor 203b and the transfer transistor 202b. Then the transfer transistor 202b is turned off, and afterwards the floating diffusion FD is reset at which point the reset voltage is measured. After the pixel has been exposed to light, the transfer transistor 202b is turned on to move the charge from the photodiode 201b to the floating diffusion FD. Then the reset plus light exposed value from the photodiode 201b is measured.

While FIG. 2A-B illustrate pixel circuits having three transistors in a particular configuration, the current disclosure is not so limited and may apply to a pixel circuit having fewer or more transistors as well as other elements, such as capacitors, resistors, and the like. Additionally, the current disclosure may be extended to configurations where one or more transistors are shared among multiple photoelectric conversion devices.

Figure 3:
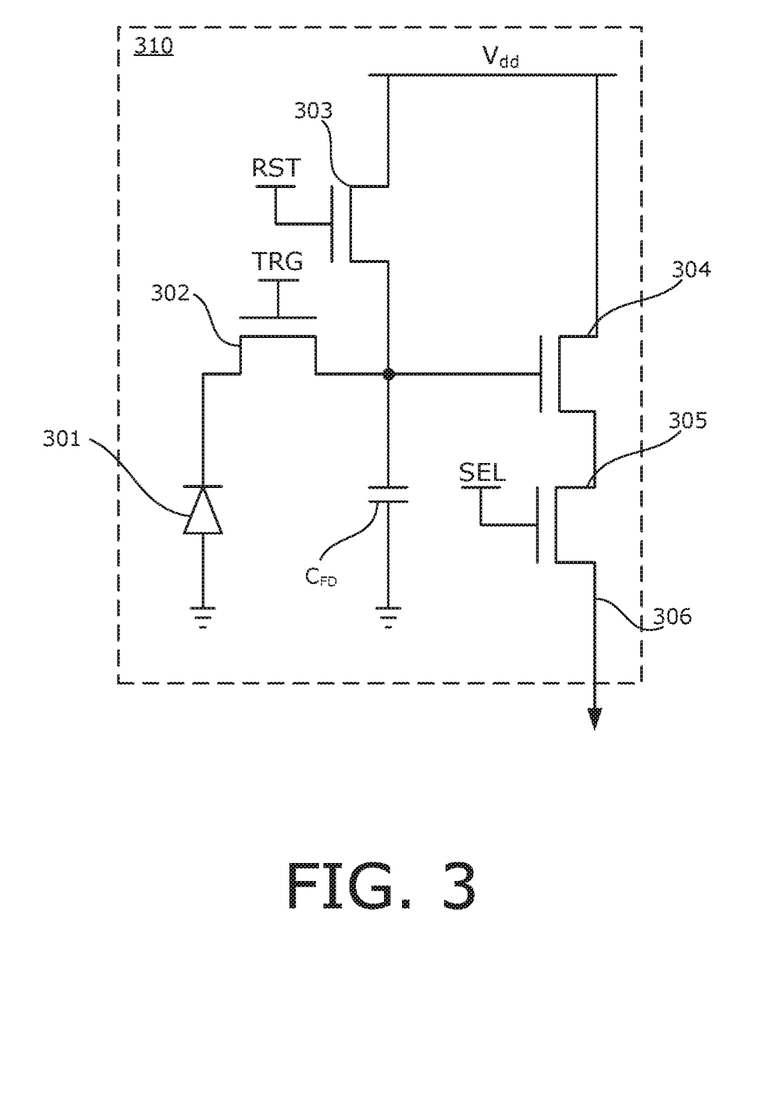
FIG. 3 illustrates another exemplary pixel circuit according to various aspects of the present disclosure.

Another example of pixel circuit 111 having a different number of transistors is pixel circuit 310 as illustrated in FIG. 3. As shown in FIG. 3, pixel circuit 310 of the so-called 4T-type includes a photoelectric conversion device 301 (for example, a photodiode), a floating diffusion FD, a transfer transistor 302, a reset transistor 303, a source follower transistor 304 (sometimes called an "amplifier transistor"), a selection transistor 305, and a vertical signal line 306. Gate electrodes of transfer transistor 302, reset transistor 303, and selection transistor 305 receive signals TRG, RST, and SEL, respectively. These signals may, for example, be provided by the control or timing circuitry, such as vertical driving circuit 120 described above.

In operation, floating diffusion FD is reset by asserting and de-asserting signal RST at the gate of reset transistor 303. After reset, a first measurement is done to capture a reset signal variation by asserting signal SEL and storing the reset signal variation outside of the pixel. Next, signal TRG is asserted allowing the collected signal on the photodiode to be added to the reset signal. Then, a second measurement is done to capture the reset plus photodiode signal variation by asserting signal SEL. Finally, the previously-obtained reset signal is subtracted from the second measurement using a subtraction method in analog or digital circuitry.

Figure 4A:
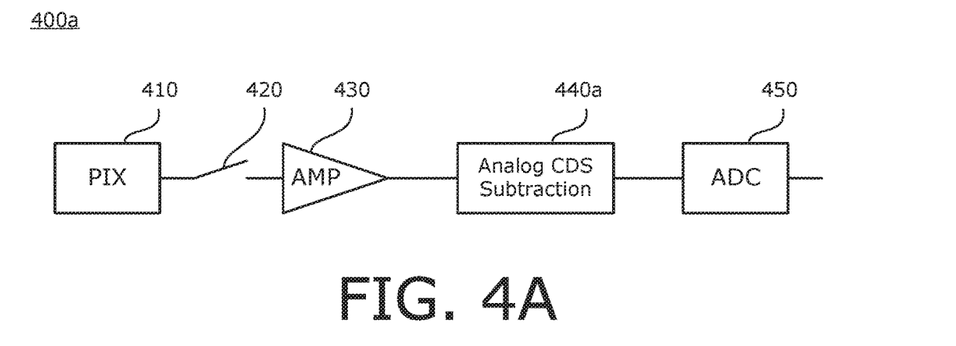
FIG. 4A illustrates an exemplary processing chain in an image sensor according to various aspects of the present disclosure with analog CDS operation.
Figure 4B:
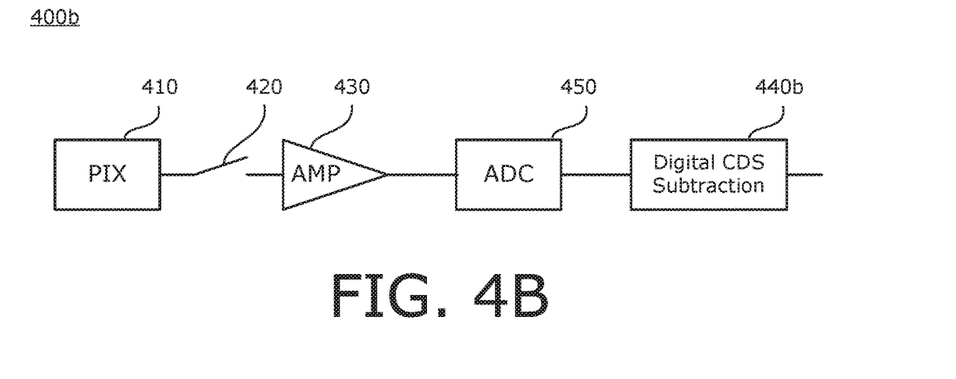
FIG. 4B illustrates an exemplary processing chain in an image sensor according to various aspects of the present disclosure with digital CDS operation.

FIGS. 4A-B illustrate exemplary processing chains 400a and 400b to implement subtraction methods in analog or digital circuitry, respectively. As illustrated in FIG. 4A, processing chain 400a includes a pixel 410, which may be pixel 210a/b, pixel 310, or another pixel; a switch 420; an analog amplifier 430 configured to provide gain to the analog signal; an analog CDS subtraction circuit 440a configured to provide a difference signal; and an ADC 450 configured to produce an output pixel value. Thus, CDS subtraction may be performed in the analog domain.

As illustrated in FIG. 4B, processing chain 400b includes a pixel 410, which may be pixel 210a/b, pixel 310, or another pixel; a switch 420; an analog amplifier 430 configured to provide gain to the analog signal; an ADC 450 configured to convert from analog to digital values; and a digital CDS subtraction circuit 440b configured to provide a difference signal as an output signal. Thus, CDS subtraction may be performed in the digital domain.

In practical circuit implementations, both processing chains 400a and 400b may be controlled by a timing circuit, such as controller 150 described above, and may be provided with memory and/or registers to store any necessary intermediate values. Depending on the particular implementation, the memory and/or registers may be provided for a single pixel, a row of pixels, the entire image, and the like. In either implementation, the pixel output undergoes an analog gain process prior to conversion to digital in ADC 450.

[Matched Comparator Active Reset Circuit]

Figure 5:
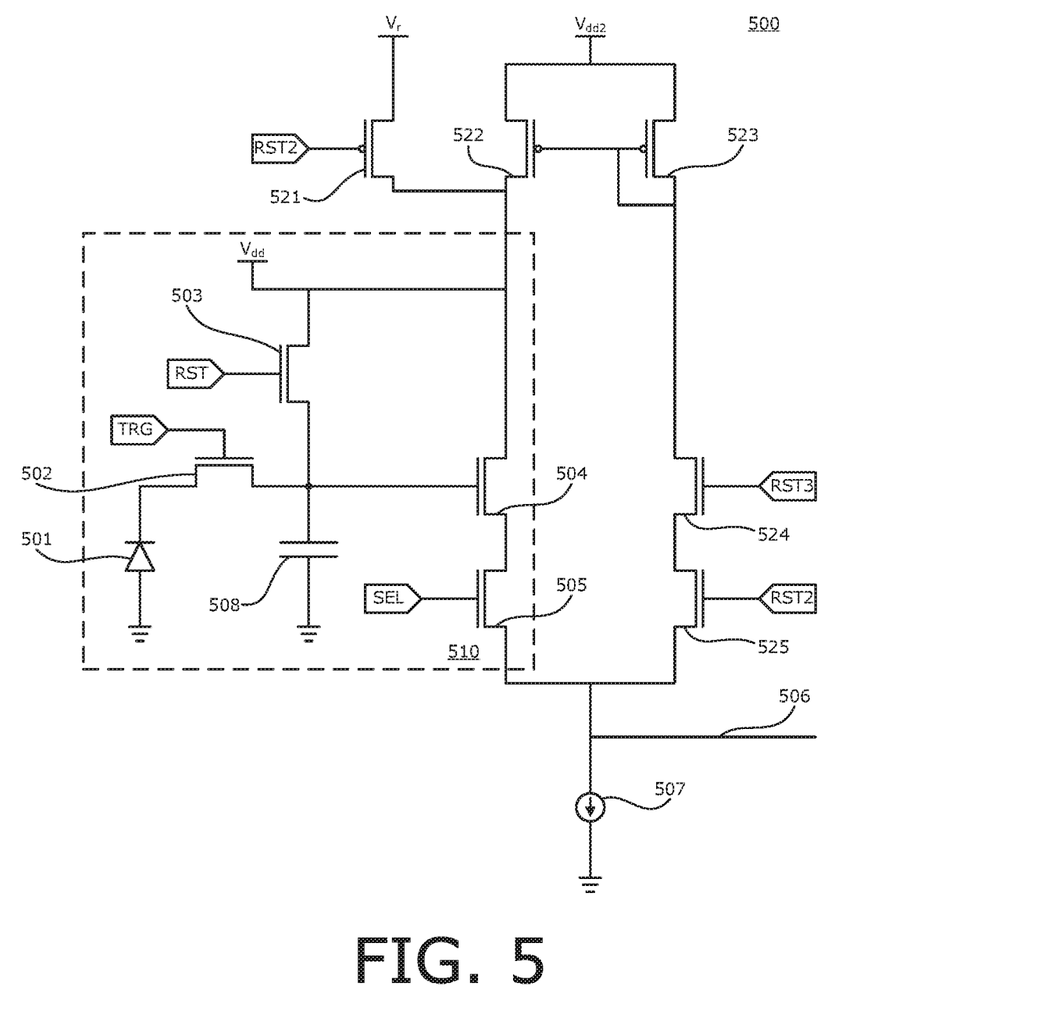
FIG. 5 illustrates an exemplary pixel circuit with a matched comparator circuit according to various aspects of the present disclosure.

FIG. 5 illustrates an exemplary matched comparator configuration including an active reset circuit 500 and a pixel circuit 510. While pixel circuit 510 is illustrated with its own matched comparator, other configurations are possible. For example, there may be one active reset circuit 500 per column, with each pixel circuit 510 in a given column sharing the active reset circuit 500 for that column. Pixel circuit 510 is illustrated as a 4T-type circuit, including a photodiode 501, a transfer transistor 502, a reset transistor 503, a source follower transistor 504, a selection transistor 505, and a holding capacitor 508. As illustrated, active reset circuit 500 shares source follower transistor 504 and selection transistor 505 with pixel circuit 510. Active reset circuit 500 additionally includes transistors 521-525 provided separate from pixel circuit 510.

Transistor 522, source follower transistor 504, and selection transistor 505 are disposed in a first current path between a power source voltage $V_{dd2}$ and a column signal line 506. Transistors 523-525 are disposed in a second current path between power source voltage $V_{dd2}$ and column signal line 506. In a case where, as noted above, multiple pixel circuits 510 are connected or connectable to a single active reset circuit 500, there may be multiple "first current paths" and one "second current path."

As illustrated, the gates of transistors 522-523 are connected to one another, and transistor 523 is arranged in a diode configuration. Transistor 525 is controlled by an active reset signal RST2 at the gate thereof. The gate of transistor 524 receives an FD voltage resetting signal RST3. Transistor 521 is disposed between a reset voltage $V_r$ and the power supply line $V_{dd}$. In operation, transistors 521 and 525 are controlled so as to have opposite conductive states during operation of the associated image sensor. As illustrated, the active/passive reset selection is accomplished by making transistors 521 and 525 of an opposite channel time and providing the same control signal RST2 to both simultaneously. Therefore, when RST2 is high, transistor 521 is in an OFF state and transistor 525 is in an ON state, and when RST2 is low, transistor 521 is in an ON state and transistor 525 is in an OFF state. Alternatively, transistors 521 and 525 may be the same channel time, and instead have opposite control signals supplied thereto.

Transistors 521 and 525 are used to control whether pixel circuit 510 will perform a passive reset operation or an active reset operation. When RST2 is low, the pixel power source voltage $V_{dd}$ is connected to the reset voltage $V_r$, while the second current path through transistors 523-525 is cut off by transistor 525. This allows for the performance of the passive reset operation by controlling the reset signal RST. When RST2 is high, on the other hand, the pixel power source voltage $V_{dd}$ is cut off from the reset voltage $V_r$ by transistor 521, and when selection signal SEL is also high the first current path through transistors 504-505 and 522, and the second current path through transistors 523-525 are both enabled to perform the active reset operation, thus stabilizing the charge in the floating diffusion capacitor and resulting in a reset voltage with smaller variation.

[Single-Slope ADC]

A single-slope ADC uses a ramp signal generated by a digital-to-analog converter (DAC), and measures the analog signal from the sensor by counting the time required by the ramp signal to cross the analog signal from the photodiode, thus providing a digital representation of the analog signal. Single-slope ADCs, as with all other types of ADC, are subject to circuit noise. In sensor operation, high levels of analog gain may be used to amplify the photodiode signal over the circuit noise level of the amplifier and ADC circuitry, thereby allowing the image sensor to generate a useful image at low light levels and low readout noise. Thus, readout noise level is an important parameter for image sensor implementations.

Figure 6:
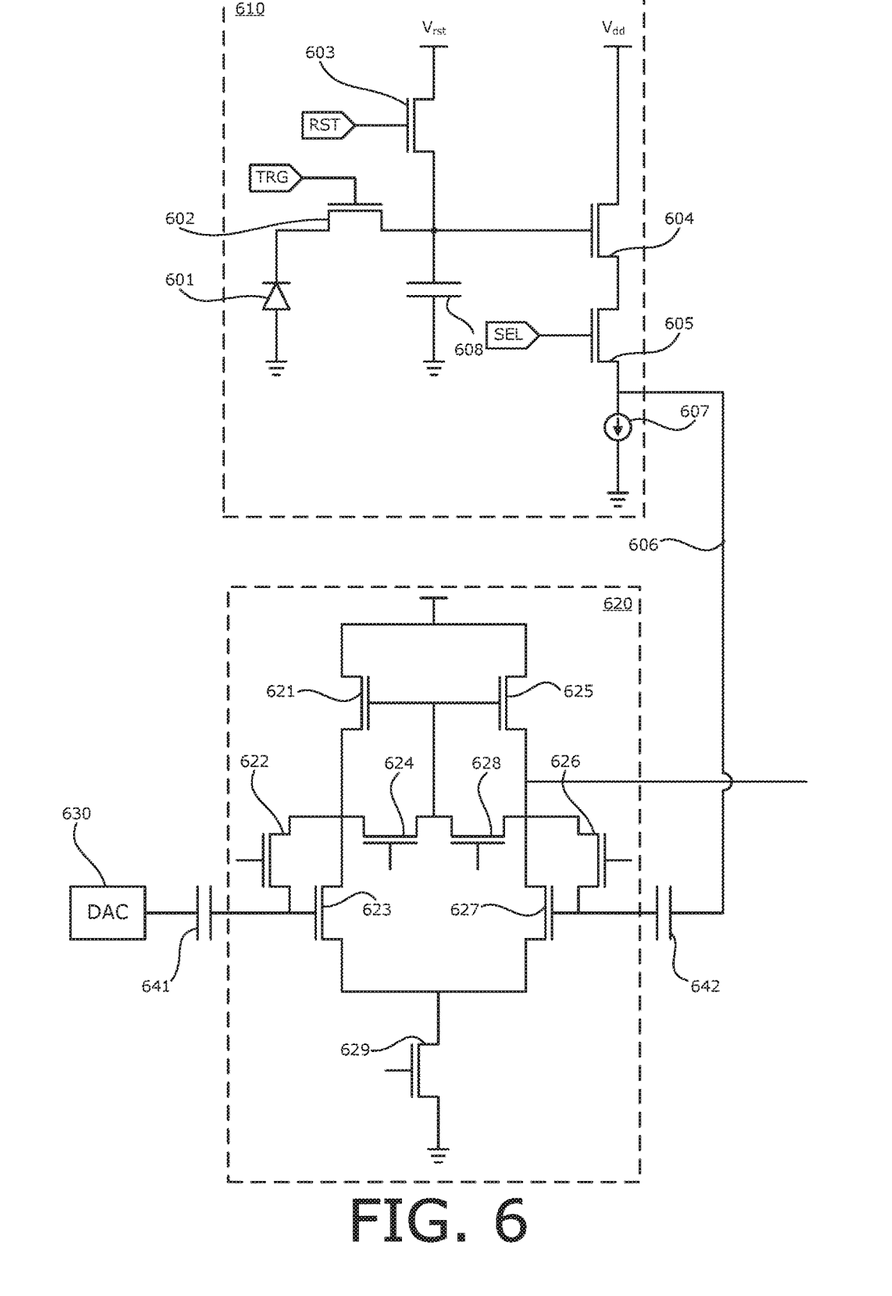
FIG. 6 illustrates an exemplary pixel circuit with a single-slope ADC according to various aspects of the present disclosure.

FIG. 6 illustrates an exemplary pixel circuit and single-slope ADC. As illustrated in FIG. 6, a 4T pixel circuit 610 is connected to a differential comparator 620 at one input thereof via signal line 606, and the other input of differential comparator 620 receives a ramp signal from a DAC 630. DAC 630 and pixel circuit 610 provide their respective signals to differential comparator 620 via a first coupling capacitor 641 and a second coupling capacitor 642, respectively.

As illustrated, pixel circuit 610 includes a photodiode 601, a transfer transistor 602, a reset transistor 603, a source follower transistor 604, a selection transistor 605, a current source 607, and a holding capacitor 608. Other pixel circuit designs, such as 3T or 5T+ configurations, may be used in a similar arrangement. Differential comparator 620 includes transistors 621-629.

Figure 7A:
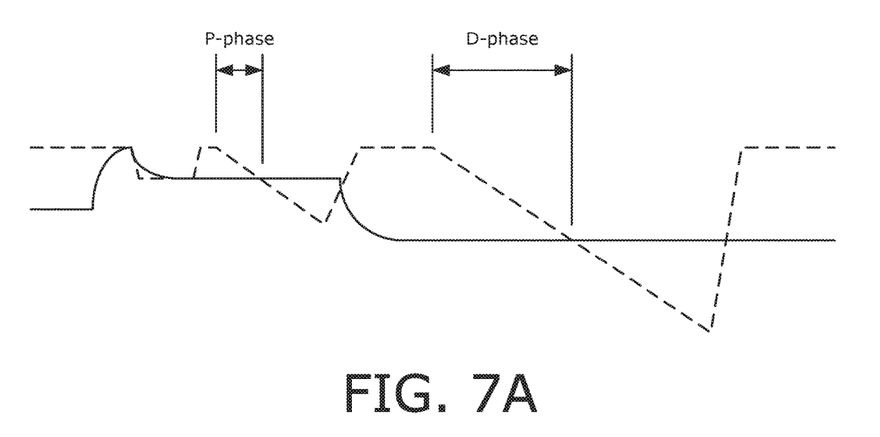
FIG. 7A illustrates an exemplary signal waveform diagram of the exemplary pixel circuit according to FIG. 6.

When the analog signal from pixel circuit 610 is sampled, DAC 630 is operated to send out a ramp signal. FIG. 7A illustrates an exemplary set of signals, where the analog signal from pixel circuit 610 is shown as a solid line and the ramp signal generated by DAC 630 is shown as a dashed line. Because CDS is performed, the ramp signal is operated for two measurement periods. During the first measurement period, pixel circuit 610 is reset. Just prior to the first measurement period, DAC 630 is reset to an initial level, and then the ramp signal ramps down under the control of DAC 630. Digital comparator 620 changes state when the ramp signal crosses the pixel signal. Counting the time in DAC 630 for this state change to occur provides a measurement of the P-phase signal.

Thereafter, pixel circuit 610 is exposed to light, and DAC 630 is restarted from the initial level before again ramping the ramp signal down. Counting the time for this subsequent state change to occur provides a measurement of the D-phase signal. The difference value between the D-phase signal and the P-phase signal gives the output value of pixel circuit 630.

To improve the accuracy of the measurements, an auto-zero (AZ) function may be performed. AZ is performed by turning on transistors 622 and 626, thus causing the two inputs of differential comparator 620 to become equal. As a result, capacitors 641 and 642 become charged so that any DC imbalance on the two sides of differential comparator 620 would cause capacitors 641 and 642 to charge to an appropriate level. The charge in capacitors 641 and 642 is maintained even when transistors 622 and 626 are turned off. Therefore, the two inputs of differential comparator 620 sense only the difference due to a change in the pixel signal or a change in the ramp signal.

The AZ process may be interpreted as one that stores the variations due to circuit noise or other parameter differences in capacitors 641 and 642. When the variation signals are stored and accounted for, the AZ circuit effectively performs measurement that is free from the noise components such as thermal noise in the pixel circuit, pass-through dispersion from the pixel circuit, offset error in the source follower transistor, non-zero offset in the two input terminals of the differential comparator, and the like. However, in a configuration where the image sensor utilizes a shared ADC structure where multiple columns of pixels share a single ADC, the AZ method cannot remove the variations resulting from the pixel readout in different columns. This is because the columns that share a single ADC must use a single AZ setting; that is, a single stored value for the variations, even though each column may have different variations.

Figure 7B:
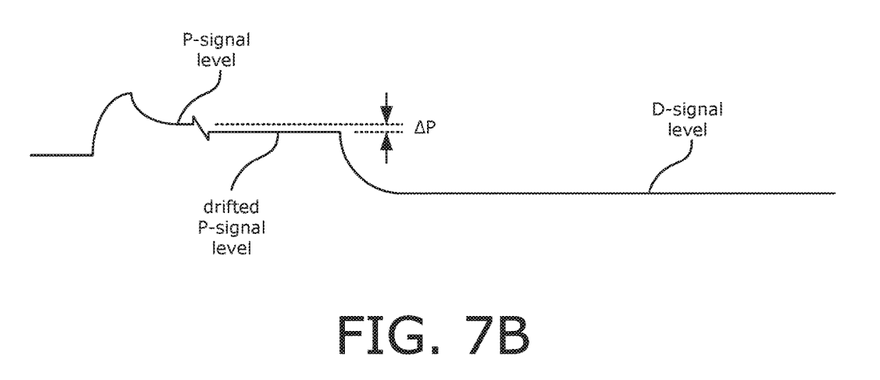
FIG. 7B illustrates an exemplary signal waveform diagram of the exemplary pixel circuit according to FIG. 6 including signal drift.

There may be additional sources of inaccuracies that the AZ circuit does not remove. For example, the signal line from pixel circuit 610 may drift during the P-phase measurement by a non-zero amount ΔP, as illustrated in FIG. 7B. This drift may be due to factors such as the thermal noise in the AZ switches (transistors 622 and 626), switching noise due to non-zero on-impedance, parameter differences between comparators within the image sensor, different delays in the ramp signals, and the like.

[Active Reset with Single-Slope ADC]

Figure 8:
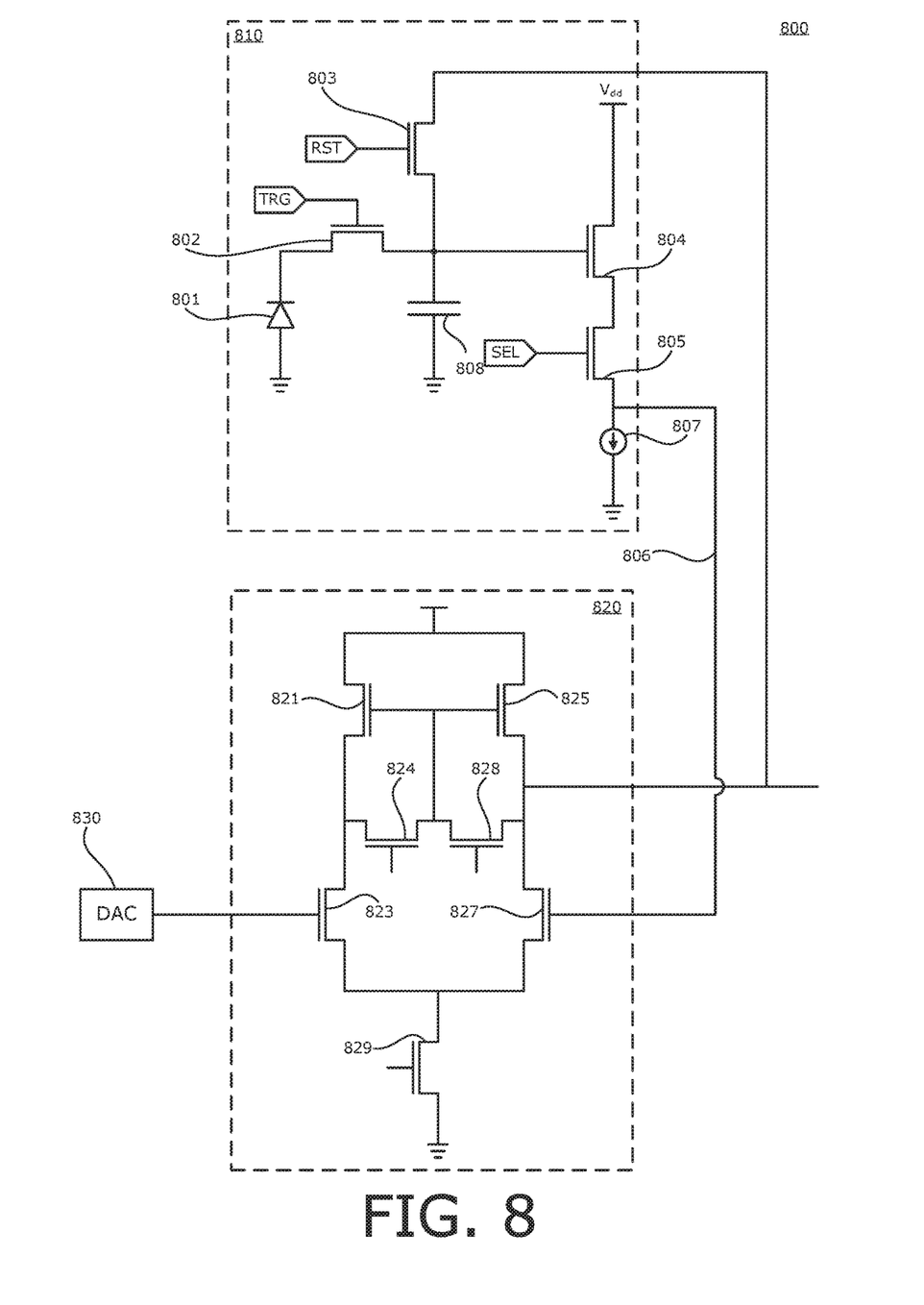
FIG. 8 illustrates an exemplary active reset circuit for a single-slope ADC according to various aspects of the present disclosure.

To further improve the measurement accuracy, an active reset method for a single-slope ADC is preferably used. FIG. 8 illustrates an exemplary active reset circuit 800 using a 4T pixel circuit 810 and a single-slope ADC including a differential comparator 820 and a DAC 830. As illustrated, pixel circuit 810 includes a photodiode 801, a transfer transistor 802, a reset transistor 803, a source follower transistor 804, a selection transistor 805, a current source 807, and a holding capacitor 808 (sometimes called a "charge to voltage conversion capacitor" or a "floating diffusion capacitor"). Pixel circuit 810 is connected to differential comparator 820 via a signal line 806. As above, other pixel circuit designs, such as 3T or 5T+ configurations, may be used in a similar arrangement. Differential comparator 820 includes transistors 821, 823-825, and 827-829. That is, as compared with differential comparator 620, two transistors as well as the two capacitors have been omitted. Moreover, compared with FIG. 6, active reset circuit 800 has a connection from the comparator output line to the source of reset transistor 803. Because no capacitor is present between DAC 830 and the input of differential comparator 820, it may be preferable to readjust the reset level of DAC 830 to match the DC operating range of differential comparator 820.

To measure the pixel signal using active reset circuit 800, DAC 830 is initialized to a reset level; for example, the initial level described above. Thereafter, reset signal RST is asserted to turn on reset transistor 803. At this point, a current flows from the output of differential comparator 820 through reset transistor 803, thus charging holding capacitor 808. This continues until holding capacitor 808 is charged to a level that achieves a balanced state at differential comparator 820. When this occurs, differential comparator 820 has achieved a neutral starting state which takes into account all of the noise sources of the circuit, including differences in resistances and capacitances of circuit elements, differences in parasitic resistances and capacitances, offsets such as comparator offset, timing differences, and the like. In particular, two potentially-large noise sources, which are the voltage variation in source follower transistor 804 and mismatch variations in differential comparator 820, are removed. After this step, reset signal RST is de-asserted to turn off reset transistor 803, and the circuit is now ready to perform measurements on the photodiode signals.

Figure 9:
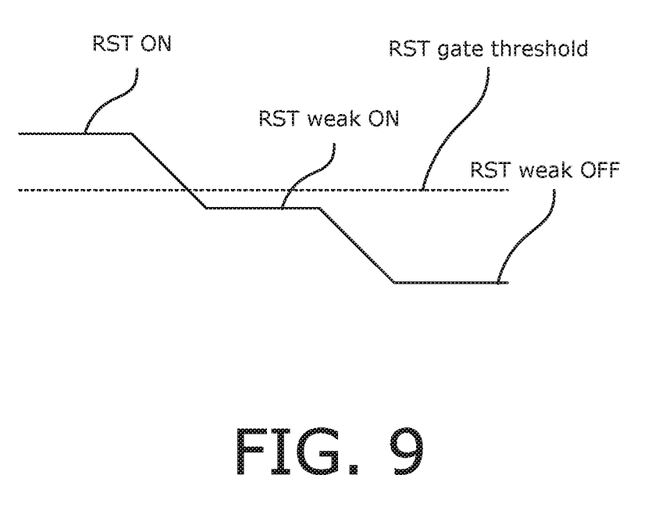
FIG. 9 illustrates an exemplary signal waveform diagram of the exemplary active reset circuit according to FIG. 8.

Alternatively, a two-step reset transistor off control may be applied. FIG. 9 illustrates an exemplary waveform diagram for the two-step reset transistor off control. In this configuration, the steps of resetting DAC 830 and turning on reset transistor 803 are the same as described above. At this point, reset transistor 803 is in the ON state and the gate voltage of reset transistor 803 is at a high level, as shown in the first portion of FIG. 9. Subsequently, the gate voltage of reset transistor 803 is reduced from the high level to an intermediate level. This intermediate level is slightly below the gate voltage threshold of reset transistor 803, such that reset transistor 803 is in a "weak ON" state. Finally, the gate voltage of reset transistor 803 is reduced to a low level. This low level is above the gate voltage threshold, such that reset transistor 803 is in an OFF state. Because reset transistor 803 is still conducting in the weak ON state, the more gradual method of transitioning reset transistor 803 to the OFF state allows holding capacitor 808 to charge to a level that more accurately represents the variations in the circuit elements. In other words, the two-step reset transistor off control reduces the through variation because it reduces the swing of reset transistor 803.

After the two-step reset transistor off control is performed, the P-phase and D-phase signals from photodiode 801 may be measured in a similar manner to that illustrated in FIG. 7A above; that is, by starting a ramp signal from DAC 830 and measuring the time required for the ramp signal to cross the pixel output signal. Because the noise variations for each particular ADC circuit are stored in the corresponding holding capacitor 808, a more accurate measurement of the P-phase and D-phase signals is obtained.

Active reset circuit 800 has a number of effects. For example, because active reset is performed while connecting to a particular pixel circuit 810, active reset circuit 800 is effective in a column sharing scheme where multiple columns of pixels share a single ADC. In this case, the reset level of each column is stored in holding capacitor 803 as measurements are being taken, and thus overcomes the limitations of a traditional AZ method whereby only one set of noise variations may be stored for each ADC.

Additionally, active reset circuit 800 allows for a more efficient usage of silicon in the image sensor. Specifically, two transistors and two capacitors are removed per ADC as compared to the circuit of FIG. 6. In an image sensor implementation where thousands of ADCS are working in parallel, active reset circuit 800 results in a more efficient design which occupies a smaller area because of the reduced circuit elements.

Moreover, active reset circuit 800 controls the reset level of the floating diffusion in pixel circuit 810 by feeding the output level of differential comparator 820 and storing it in holding capacitor 803. This allows the reset level of the circuit to be controlled by adjusting the reset level of DAC 830. In this manner, dark current in pixel circuit 810 may be minimized by resetting pixel circuit 810 to the lowest voltage level necessary to support the used dynamic range at any given system gain; that is, at any analog gain of the circuit.

Furthermore, active reset circuit 800 allows the performance of analog-to-digital conversion on the analog pixel signals at substantially the same speed as a single-slope ADC that does not incorporate active reset, while still enabling full CDS and permitting the use of high analog gain levels.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An image sensor, comprising:
   a pixel circuit including a reset transistor and configured to output a pixel signal;

a differential comparator including a pixel input, a reference input, and a comparator output;
a first signal line connected to the pixel circuit and to the differential comparator; and
a second signal line connected to one of a source or a drain of the reset transistor and to the comparator output.

2. The image sensor according to claim 1, further comprising:
a digital-to-analog converter configured to output a reference signal having a ramp waveform.

3. The image sensor according to claim 2, wherein the differential comparator is configured to receive the pixel signal at the pixel input and the reference signal at the reference input, and output a representation of digital signal.

4. The image sensor according to claim 2, wherein:
the digital-to-analog converter is configured to initialize to an initial signal level and then output the ramp waveform, at which point the differential comparator is configured to perform a P-phase measurement corresponding to a reset level of the pixel circuit, and
the digital-to-analog converter is configured to subsequently re-initialize to the initial signal level and then output the ramp waveform, at which point the differential comparator is configured to perform a D-phase measurement corresponding to a data level of the pixel circuit.

5. The image sensor according to claim 4, wherein the initial signal level is based on a system gain of the image sensor.

6. The image sensor according to claim 1, wherein a gate of the reset transistor is configured to receive a high reset level, an intermediate reset level, and a low reset level in this order.

7. The image sensor according to claim 6, wherein the high reset level and the intermediate reset level are higher than a gate threshold of the reset transistor, and the low reset level is lower than the gate threshold of the reset transistor.

8. The image sensor according to claim 1, wherein the pixel circuit further includes a photodiode, a transfer transistor, a source follower transistor, and a holding capacitor.

9. The image sensor according to claim 8, wherein the pixel circuit further includes a selection transistor.

10. The image sensor according to claim 1, wherein
the pixel circuit is one of a plurality of pixel circuits arranged in a matrix, and
the differential comparator corresponds to a plurality of columns of the matrix.

11. An image processing method, comprising:
outputting a pixel signal from a pixel circuit including a reset transistor via a first signal line; and
outputting a difference signal from a differential comparator including a pixel input, a reference input, and a comparator output,
wherein one of a source or a drain of the reset transistor is connected to the comparator output via a second signal line.

12. The image processing method according to claim 11, further comprising:
outputting a reference signal having a ramp waveform from a digital-to-analog converter.

13. The image processing method according to claim 12, further comprising:
receiving the reference signal at the reference input of the differential comparator; and
receiving the pixel signal at the pixel input of the differential comparator.

14. The image processing method according to claim 12, further comprising:
initializing the digital-to-analog converter to an initial signal level, and then outputting the ramp waveform;
thereafter performing a P-phase measurement corresponding to a reset level of the pixel circuit;
thereafter re-initializing the digital-to-analog converter to the initial signal level, and then outputting the ramp waveform;
thereafter performing a D-phase measurement corresponding to a data level of the pixel circuit.

15. The image processing method according to claim 14, wherein the initial signal level is based on a system gain of the image sensor.

16. The image processing method according to claim 11, further comprising:
receiving, at a gate of the reset transistor, a high reset level, an intermediate reset level, and a low reset level in this order.

17. The image processing method according to claim 16, wherein the high reset level and the intermediate reset level are higher than a gate threshold of the reset transistor, and the low reset level is lower than the gate threshold of the reset transistor.

18. The image processing method according to claim 11, wherein the pixel circuit further includes a photodiode, a transfer transistor, a source follower transistor, and a holding capacitor.

19. The image processing method according to claim 18, wherein the pixel circuit further includes a selection transistor.

20. The image processing method according to claim 11, wherein
the pixel circuit is one of a plurality of pixel circuits arranged in a matrix, and
the differential comparator corresponds to a plurality of columns of the matrix.

* * * * *